United States Patent [19]

Tsunoda et al.

[11] Patent Number: 4,537,558
[45] Date of Patent: Aug. 27, 1985

[54] MULTI-STAGE HYDRAULIC MACHINE AND CONTROL METHOD FOR A MULTI-STAGE HYDRAULIC MACHINE

[75] Inventors: Sachio Tsunoda, Yokohama; Shinsaku Sato, Ebina, both of Japan

[73] Assignee: Tokyo Shibaura Denki Kabushiki Kaisha, Kawasaki, Japan

[21] Appl. No.: 343,325

[22] Filed: Jan. 27, 1982

[30] Foreign Application Priority Data

Feb. 3, 1981 [JP] Japan .................... 56-13800
Feb. 3, 1981 [JP] Japan .................... 56-13801

[51] Int. Cl.³ ............................................ F01D 17/00
[52] U.S. Cl. ............................... 415/1; 415/500
[58] Field of Search ............... 415/1, 500, 62, 145

[56] References Cited

U.S. PATENT DOCUMENTS

| | | | |
|---|---|---|---|
| 3,507,603 | 4/1970 | von Widdern | 415/500 |
| 3,658,436 | 4/1972 | Oishi et al. | 415/1 |
| 3,890,059 | 6/1975 | Takase | 415/106 |
| 3,945,254 | 3/1976 | Hagiya et al. | 415/1 |
| 4,179,237 | 12/1979 | Ogiwara et al. | 415/1 |
| 4,412,779 | 11/1983 | Tsunoda et al. | 415/500 X |

FOREIGN PATENT DOCUMENTS

| | | |
|---|---|---|
| 1503290 | 12/1970 | Fed. Rep. of Germany . |
| 54-114650 | 9/1978 | Japan . |
| 114650 | 9/1979 | Japan . |
| 48010 | 10/1980 | Japan ............... 415/1 |
| 48102 | 2/1981 | Japan ............... 415/500 |
| 48203 | 3/1982 | Japan ............... 415/1 |
| 1009900 | 11/1965 | United Kingdom ....... 415/1 |
| 1239413 | 7/1968 | United Kingdom ....... 415/500 |
| 1565603 | 4/1978 | United Kingdom . |

Primary Examiner—Philip R. Coe
Assistant Examiner—Frankie L. Stinson
Attorney, Agent, or Firm—Oblon, Fisher, Spivak, McClelland & Maier

[57] ABSTRACT

A multi-stage hydraulic machine comprises a rotatable shaft, a plurality of runners fixed to the shaft and arranged from a highest-pressure stage to a lowest-pressure stage, runner chambers which, respectively, house the runners, a return channel for connecting adjacent ones of the runner chambers with each other, movable wicket gates provided at least in the highest-pressure stage and capable of moving between a position in which the movable wicket gates block the channel and a position in which the movable wicket gates open the channel, a casing connected to the highest-pressure stage, and an inlet valve disposed between the casing and a penstock.

8 Claims, 6 Drawing Figures

MULTI-STAGE HYDRAULIC MACHINE AND CONTROL METHOD FOR A MULTI-STAGE HYDRAULIC MACHINE

Background of the Invention

The present invention relates to a multi-stage hydraulic machine and a control method for a multi-stage hydraulic machine having a plurality of stages from a highest-pressure stage to a lowest-pressure stage, and more particularly to a multi-stage hydraulic machine and a control method for a multi-stage hydraulic machine in which the runner chambers of adjacent stages communicate with each other through a return channel and at least the highest-pressure stage is provided with movable wicket gates, the control method being applicable to the period of time during which the mode of operation is shifted from the power generating operation or the pumping operation to the idling operation.

In hydraulic machines as are conventionally used, highly pressurized air is in general sucked up by a water level depressor to feed the air up to above the water level at the upper part of the suction pipe in order to reduce the torque for driving the runners when the power generating operation or the pumping operation is, respectively, shifted to the turbine condenser operation or the pumping standby operation.

In a multi-stage hydraulic machine having a plurality of stages, the runner chambers of adjacent stages communicate with each other through a return channel. Therefore, the multi-stage hydraulic machine has a complicated channel system. Thus, various problems for feeding air and discharging water are presented when the power generating operation or the pumping operation is shifted to the corresponding idling operation. In particular, in the case of a multi-stage hydraulic machine provided with movable wicket gates at least in the highest-pressure stage in order to safely control the driving condition during this transition, the channels of the respective stages from the highest-pressure stage to the lowest-pressure stage are in constant communication with each other. Consequently, when pressurized air is fed to the channels, mutual interference occurs among the respective stages. Thus, it is difficult to carry out smoothly the air-feeding/water-discharging operation and there arises a problem in the method for feeding air.

Multi-stage hydraulic machines provided with movable wicket gates at least in their highest-pressure stages have not been extensively developed from the technical point of view. In fact, no convenient and proper drive control method for such machines has been yet proposed that is applicable in the case where the power generating operation or pumping operation is shifted to the idling operation.

SUMMARY OF THE INVENTION

The present invention has been made in consideration of this and has for its object to provide a multi-stage hydraulic machine and a control method for a multi-stage hydraulic machine according to which, while the power generating operation or the pumping operation is changed to the corresponding idling operation, air can be reliably fed and a smooth shift from the power generating operation or the pumping operation to the corresponding idling operation can be ensured in a short period of time.

According to an aspect of the present invention, there is provided a control method for a multi-stage hydraulic machine which comprises a rotatable shaft; a plurality of runners fixed to the shaft and arranged from a highest-pressure stage to a lowest-pressure stage; runner chambers which, respectively, house the runners; a return channel for connecting adjacent ones of the runner chambers with each other; movable wicket gates provided at least in the highest-pressure stage and capable of moving between a position in which the movable wicket gates block the channel and a position in which the movable wicket gates open the channel; a casing connected to the highest-pressure stage, and an inlet valve disposed between the casing and a penstock, the method comprising a first step of causing the movable wicket gates and the inlet valve to block the channel;

a second step of feeding air to an upper portion of a draft tube which is connected to a lower portion of the lowest-pressure stage after the channel is substantially blocked by the movable wicket gates;

a third step of discharging water in the return channel and the lowest-pressure stage runner chamber adjacent thereto through a lowest-pressure stage drain pipe after a water level in the draft tube is lowered to a predetermined value;

a fourth step of discharging water in the higher-pressure stage runner chamber to the draft tube through a highest-pressure stage drain pipe after a pressure in the highest-pressure stage runner chamber is lowered below a predetermined pressure; and a fifth step of interrupting the operation of air-feeding in the second step after the water level in the draft tube is stabilized at a predetermined value.

According to the present invention, when the water level in the channel inside the movable wicket gates of the highest-pressure stage is to be lowered, the movable wicket gates of the highest-pressure stage are all closed and air is fed only to some of the draft tubes which are maintained at low pressure. Therefore, a compact air-feeding device which, as an air compressor, has a small air capacity and is economical may be utilized well. Further, a control system for feeding air is extremely simplified, and since the air pressure does not cause an axial thrust to act on the rotating part which tends to move in the axial direction, safe operation is assured.

The water level in the lowest-pressure stage runner chamber is lowered by the pressurized air, and then the outer circumferential portion of the runner chamber except for the highest-pressure stage runner chamber communicates with the draft tube through the drain pipe. Therefore, water which remains in the outer circumferential portion of the lower-pressure stage runner chamber is completely discharged in a short period of time through the drain pipe which is connected thereto by utilizing the centrifugal force of the lower-pressure stage runner chamber.

Sequentially, the area from which water is discharged by the pressurized air is extended from the lowest-pressure stage to the highest-pressure stage, so that unstable phenomena caused by the interference of water which is discharged from each stage runner chamber are eliminated, accomplishing smooth drainage.

In this manner, the air-feeding/water-discharging operation is performed. The pressure of the highest-pressure stage runner chamber is lowered to a safe pressure which is higher than the predetermined pressure.

Thereafter, water which remains in the outer circumferential portion of the highest-pressure stage runner chamber is discharged to the draft tube. By the centrifugal force which acts in the highest-pressure stage runner chamber which is maintained at the safe pressure, water is properly discharged therefrom.

When the water level in the spiral casing, which is defined as the outer channel area of the movable wicket gates of the highest-pressure stage, is to be lowered, the spiral casing must communicate with the outer atmosphere, thus eliminating the pressure which is imposed on the draft tube by the tailrace. In this condition, water which is fed into the spiral casing is naturally drained to the draft tube through a drain pipe for the spiral casing. Therefore, the water level in the spiral casing is lowered safely eliminating the danger of the pressurized air. Further, the water in the spiral casing does not leak through a space between movable wicket gates of the highest-pressure stage nor flow into the highest-pressure stage runner chamber. Thus, the idling losses are minimized, thus accomplishing an economical idling operation.

As described above, in a multi-stage hydraulic machine having movable wicket gate at least in the highest-pressure stage and the respective runners from the highest-pressure stage to the lowest-pressure stage which are, respectively, coupled together through return channels, when the power generating operation or the pumping operation is, respectively, to be shifted to the corresponding idling operation, a control method is provided with easy, speedy, proper, and smooth operation according to the present invention.

DETAILED DESCRIPTION OF THE PREFERRED EMBODIMENTS

Figure 1:
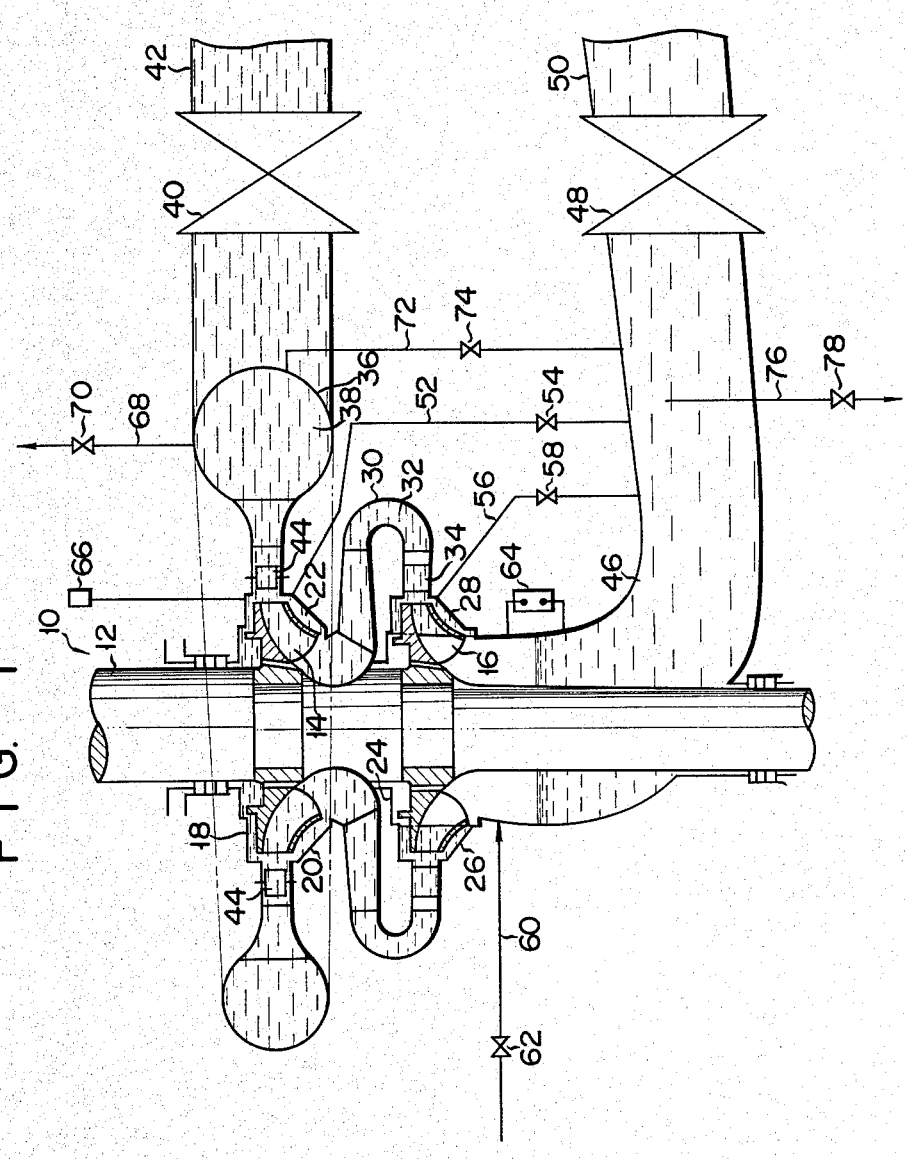
FIG. 1 is a longitudinal sectional view schematically showing a two-stage Francis type reversible pump turbine to which a control method of a first embodiment according to the present invention is applied when the water level in a draft tube is lowered.

A first embodiment of a multi-stage hydraulic machine according to the present invention will be described in detail with reference to FIGS. 1 to 4.

Referring to a construction of a multi-stage hydraulic machine used in this embodiment, a two-stage Francis type reversible pump turbine 10 is used as the multi-stage hydraulic machine. The pump turbine 10 has a main shaft 12 rotatably disposed along the vertical direction. To this shaft 12 are mounted a high-pressure stage runner 14 and a low-pressure stage runner 16. The high-pressure stage runner 14 and the low-pressure stage runner 16 are spaced apart from each other by a predetermined distance along the direction of the axis of the main shaft 12. The main shaft 12, the high-pressure stage runner 14 and the low-pressure stage runner 16 constitute movable members.

Stationary members are provided around the movable members mentioned above. These stationary members are fixed underground through concrete. The stationary members comprise a first upper cover 18 and a first lower cover 20 which define a high-pressure stage runner chamber 22 therebetween. The high-pressure stage runner 14 is housed in the high-pressure stage runner chamber 22. Below the first lower cover 20 are disposed a second upper cover 24 and a second lower cover 26 which define a low-pressure stage runner chamber 28 therebetween. The low-pressure stage runner 16 is housed in this low-pressure stage runner chamber 28. The high-pressure stage runner chamber 22 communicates with the low-pressure stage runner chamber 28 through a return channel 30. A return vane 32 is disposed substantially in the central position of the return channel 30. A stay vane 34 is disposed in the portion of the return channel 30 where it is open to the low-pressure stage runner chamber 28.

A spiral casing 36 is disposed outside the high-pressure stage runner chamber 22. The interior of this spiral casing 36 defines a vortex chamber 38. The outlet of the vortex chamber 38 and the high-pressure stage runner chamber 22 communicate with each other. The inlet of the vortex chamber 38 is connected through an inlet valve 40 to a penstock 42 which is connected to an upper reservoir (not shown). A plurality of movable wicket gates 44 are disposed in the water channel outside the high-pressure stage runner 14. The movable wicket gates 44 are coaxial with the main shaft 12 and pivotal between the position in which they close the water channel and the position in which they open it. The opening of the movable wicket gates 44 is defined by a wicket gates actuator mechanism (not shown).

One end of an elbow-shaped draft tube 46 is connected to the low-pressure stage runner chamber 28. The other end of the draft tube 46 communicates with a tailrace 50, through an outlet valve 48, which is connected to a lower reservoir (not shown).

The outer circumferential portion of the high-pressure stage runner chamber 22 is connected to the draft tube 46 through a first drain pipe 52. A first drain valve 54 is disposed at the first drain pipe 52. The outer circumferential portion of the low-pressure stage runner chamber 28 is connected to the draft tube 46 through a second drain pipe 56. A second drain valve 58 is disposed at the second drain pipe 56. Further, the upper portion of the draft tube 46 is connected to an air-feeding device (not shown) through an air supply pipe 60. An air supply valve 62 is disposed at the air supply pipe 60. At the upper portion of the draft tube 46 is disposed a water level detector 64 which detects the water level in the draft tube 46. Similarly, a pressure detector 66 which detects the pressure in the high-pressure stage runner chamber 22 is disposed at the upper portion thereof.

The upper portion of the vortex chamber 38 of the spiral casing 36 communicates with the outer atmosphere through a vent pipe 68. A vent valve 70 is disposed at the vent pipe 68. Further, the substantially central portion of the vortex chamber 38 is connected to the draft tube 46 through a spiral casing drain pipe 72. A third drain valve 74 is disposed at the spiral casing drain pipe 72. The draft tube 46 communicates with a drain pit (not shown) in the outer atmosphere through an outer drain pipe 76. A fourth drain valve 78 is disposed at the outer drain pipe 76.

When the reversible pump turbine 10 with the above construction is to be operated as a turbine, pressurized water flows from the penstock 42 to the vortex chamber 38 through the inlet valve 40 which is open. The pressurized water passes by the movable wicket gates 44 which are disposed on the outer circumference of the high-pressure stage runner chamber 22, so that the high-pressure stage runner 14 rotates. The water flows into the low-pressure stage runner chamber 28 through the return channel 30, so that the low-pressure stage runner 16 rotates. As a result, the main shaft 12 rotates. The water then flows out to the tailrace 50 through the draft tube 46 and the outlet valve 48.

When the reversible pump turbine 10 as described above is to be operated as a pump, the main shaft 12 is rotated by a prime mover (not shown) in a direction opposite to the direction of the turbine operation. Therefore, water which is pumped to the low-pressure stage runner 16 flows back from the tailrace 50 to the penstock 42 in a route opposite to that of the case of the turbine operation.

A control method will be described in which the power generating operation or the pumping operation is shifted to the corresponding idling operation when the first embodiment of the present invention is applied to the reversible pump turbine 12 as described above. In order to shift the mode of operation from the power generating operation or the pumping operation to the corresponding idling operation, the movable wicket gates 12 in the high-pressure stage runner chamber 22 and the inlet valve 40 are simultaneously or sequentially closed fully. The air supply valve 62 of the air supply pipe 60 which is connected to the upper portion of the draft tube 46 is then opened, so that air is fed to the upper portion of the draft tube 46. Therefore, the water level of the draft tube 46 is lowered to the predetermined level (refer to FIG. 1).

Figure 2:
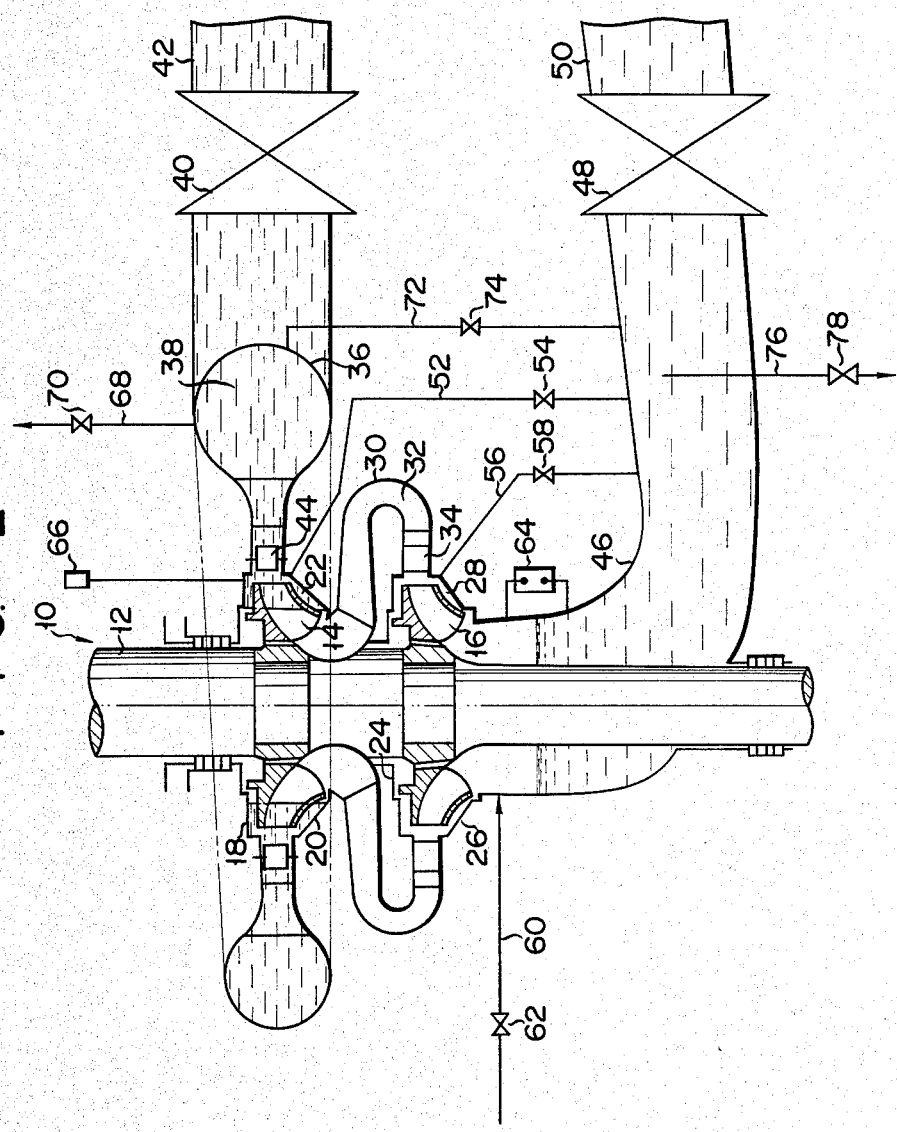
FIG. 2 is a longitudinal sectional view showing the pump turbine in a water-discharging operation in a return channel.
Figure 3:
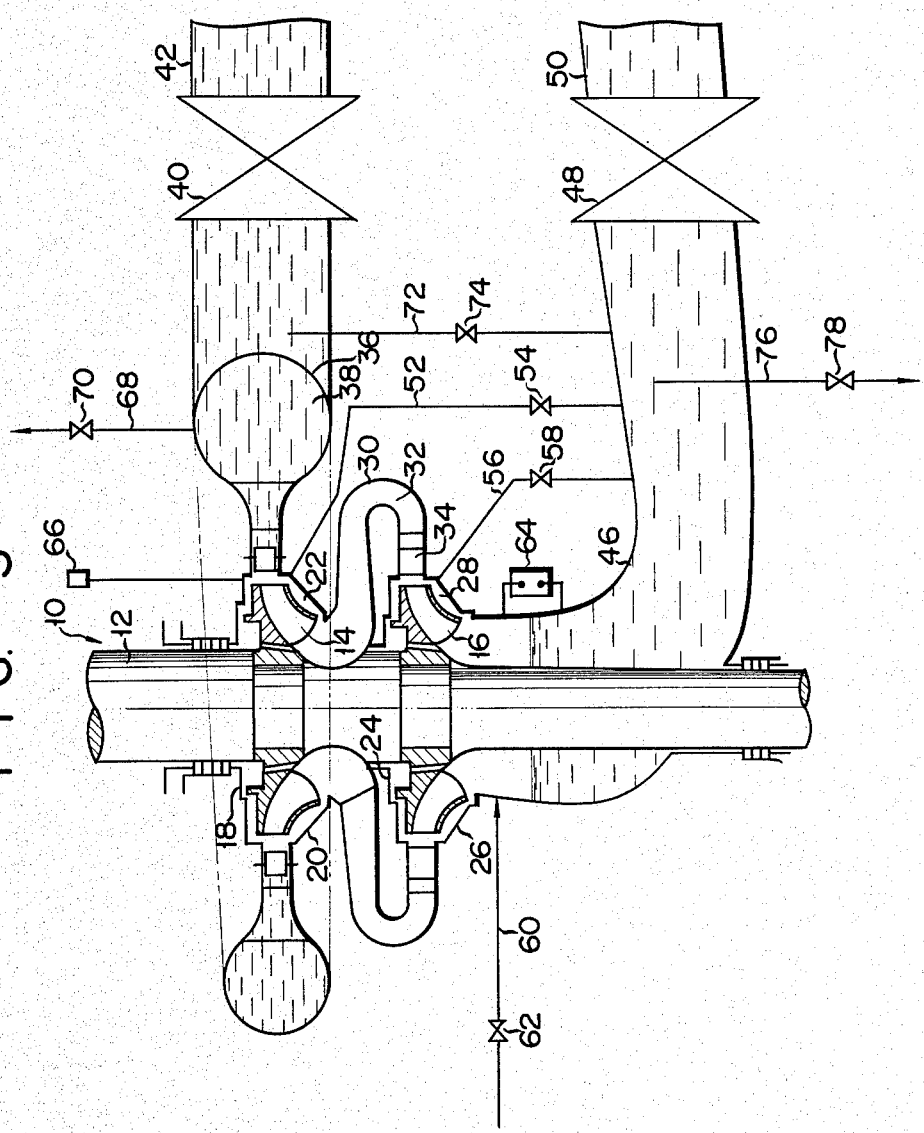
FIG. 3 is a longitudinal sectional view showing the pump turbine in a water-discharging operation in a high-pressure stage runner chamber.
Figure 4:
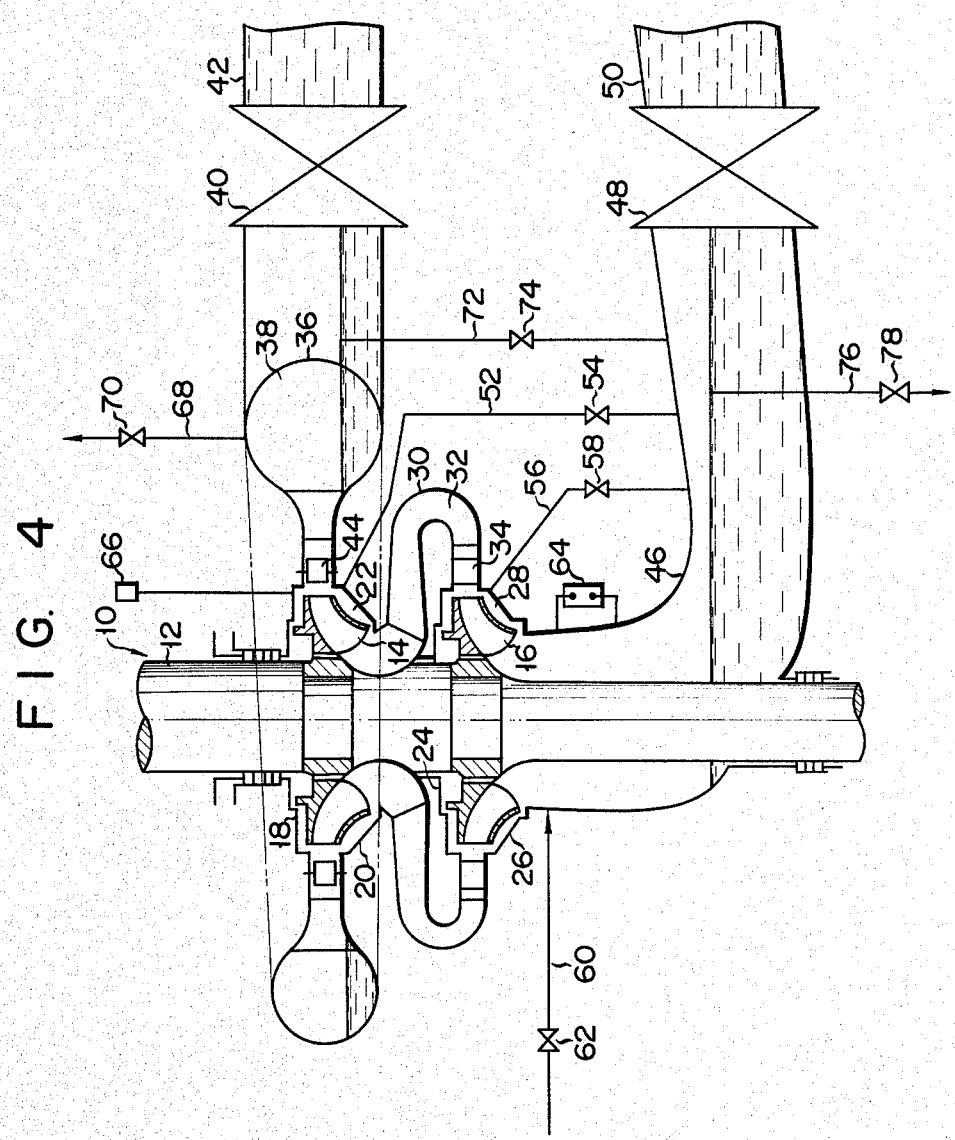
FIG. 4 is a longitudinal sectional view showing the pump turbine in a water-discharging operation in a spiral casing.

Subsequently, the second drain valve 58 is open, so that water which remains in the outer circumferential portion of the low-pressure stage runner chamber 28 and the return channel 30 is discharged to the draft tube 46 through the low-pressure stage drain pipe 56 (refer to FIG. 2).

When the water level in the draft tube 46 reaches the predetermined level, this condition is detected by the pressure detector (not shown) which is arranged in the low-pressure stage runner chamber 28 or by the water level detector 64 which is arranged in the draft tube 46. The second drain valve 58 is opened in response to a detection signal from one of the detectors. When the pressure of the high-pressure stage runner chamber 22 is lowered below the predetermined value, the first drain valve 54 is open, so that water which remains in the outer circumferential portion of the high-pressure stage runner chamber 22 is discharged to the draft tube 46 through the high-pressure stage drain pipe 52. Further, when the water level of the draft tube 46 is stabilized at the predetermined value, the air supply valve 62 of the air supply pipe 60 is closed. Therefore, air is not fed to the draft tube 46, and the mode of operation of each runner is shifted to the idling operation (refer to FIG. 3).

When, the pressure of the high-pressure runner chamber 22 reaches the predetermined level, this condition is detected by the pressure detector 66 which is arranged therein. The detection signal from the pressure detector 66 is supplied to the first drain valve 54 so that the drain valve 54 is opened. When the water level of the draft tube 46 reaches the predetermined value, this condition is detected by the water level detector 64 which is arranged at the upper portion of the draft tube 46 and the detection signal is supplied to the air supply valve 62, so that the air supply valve 62 is closed.

The water level of the inner channel of the movable wicket gates 44 which are closed is lowered by the air-feeding/water-discharging operation. The water level in the spiral casing 36 which is defined as the outer channel of the movable wicket gates 44 is lowered in the following manner.

In the idling operation, the outlet valve 48 of the draft tube 46 is closed. Thereafter, the third drain valve 74 is opened and the vent valve 70 and the fourth drain valve 78 of the draft tube 48 are simultaneously opened. Therefore, the spiral casing 36 communicates with the outer atmosphere through the vent pipe 68 so that water which remains in the spiral casing 36 is naturally discharged to the draft tube 46 through a spiral casing drain pipe 72. On the other hand the water in the draft tube 46 is discharged to the outer drain pit through the outer drain pipe 76. In this manner, the water level in the spiral casing 36 is lowered (refer to FIG. 4).

The third drain valve 74, the spiral casing vent valve 70 and the fourth drain valve 78 are operated in the fully open condition of the outlet valve 48 of the draft tube 46. This fully open condition is detected by a limit switch (not shown) or defined by a timer device (not shown) which presets the mode of operation in which the third drain valve 74, the spiral casing vent valve 70 and the fourth drain valve 78 operate after the fully open condition of the outlet valve 48 of the draft tube 46 is detected. A detection signal from the limit switch or the timer device is supplied to the third drain valve 74, the spiral casing vent valve 70 and the fourth drain valve 78, so that these valves 74, 70 and 78 are simultaneously or sequentially opened.

The present invention is not limited to the particular embodiment as described above. Various changes and modifications may be made within the spirit and scope of the present invention.

Figure 5:
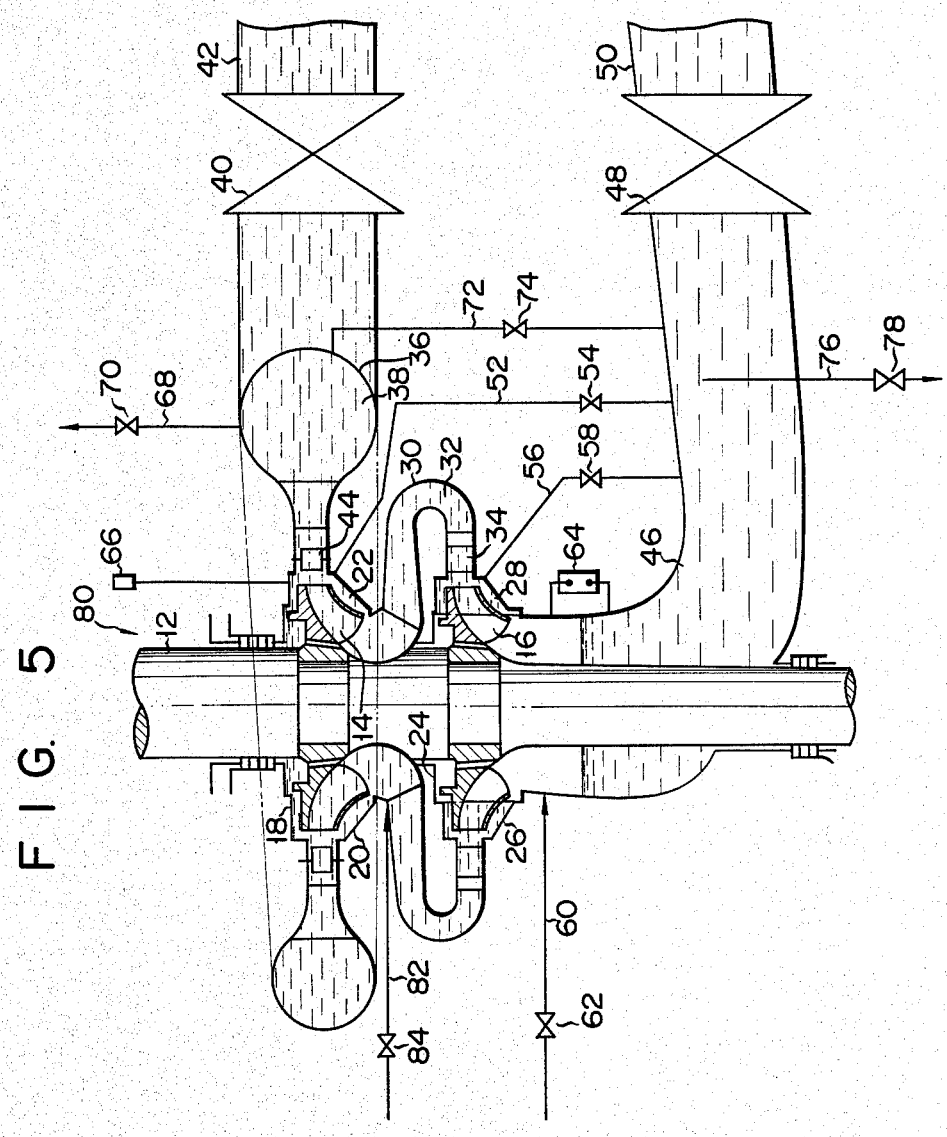
FIG. 5 is a longitudinal sectional view schematically showing a two-stage Francis type reversible pump turbine to which a control method of a second embodiment according to the present invention is applied when the water level of a draft tube is lowered.

For example, as shown in FIG. 5, a two-stage Francis pump turbine 80 will be described according to a second embodiment of the present invention. The same reference numerals as in the first embodiment denote the same parts in the second embodiment, and the detailed description thereof will be omitted. One end of an air supply pipe 82 is connected to a portion of the return channel 30 near the outlet portion of the high-pressure stage runner chamber 22. The other end of the air supply pipe 82 is connected to an air supply device (not shown). An air supply valve 84 is arranged in the air supply pipe 82. The air supply device may also function as the air supply device as described in the first embodiment, besides its original function.

When the control method according to the present invention is applied to the reversible pump turbine 80, the water-discharging operation in the return channel 30 differs from that applied in the reversible pump turbine 10 in the first embodiment. When the water level of the draft tube 46 is lowered to the predetermined water level, the air supply valve 62 is closed and the operation for feeding air to the upper portion of the draft tube 46 is interrupted. Thereafter, the air supply valve 84 is opened, so that air is fed to the upper portion of the return channel 30. When this air-supply operation is initiated, the second drain valve 58 is opened so that water which remains in the low-pressure stage runner chamber 28 and the return channel 30 is discharged to the draft pipe 46 through the low-pressure stage second drain pipe 56.

In this manner, according to the second embodiment of the present invention, the water which remains in the low-pressure stage runner chamber 28 and the return channel 30 is forcibly discharged by feeding the pressurized air thereto in addition to the centrifugal force which is utilized for this purpose. Therefore, the water which remains in the return channel 30 is completely discharged as compared with the method used in the first embodiment.

Figure 6:
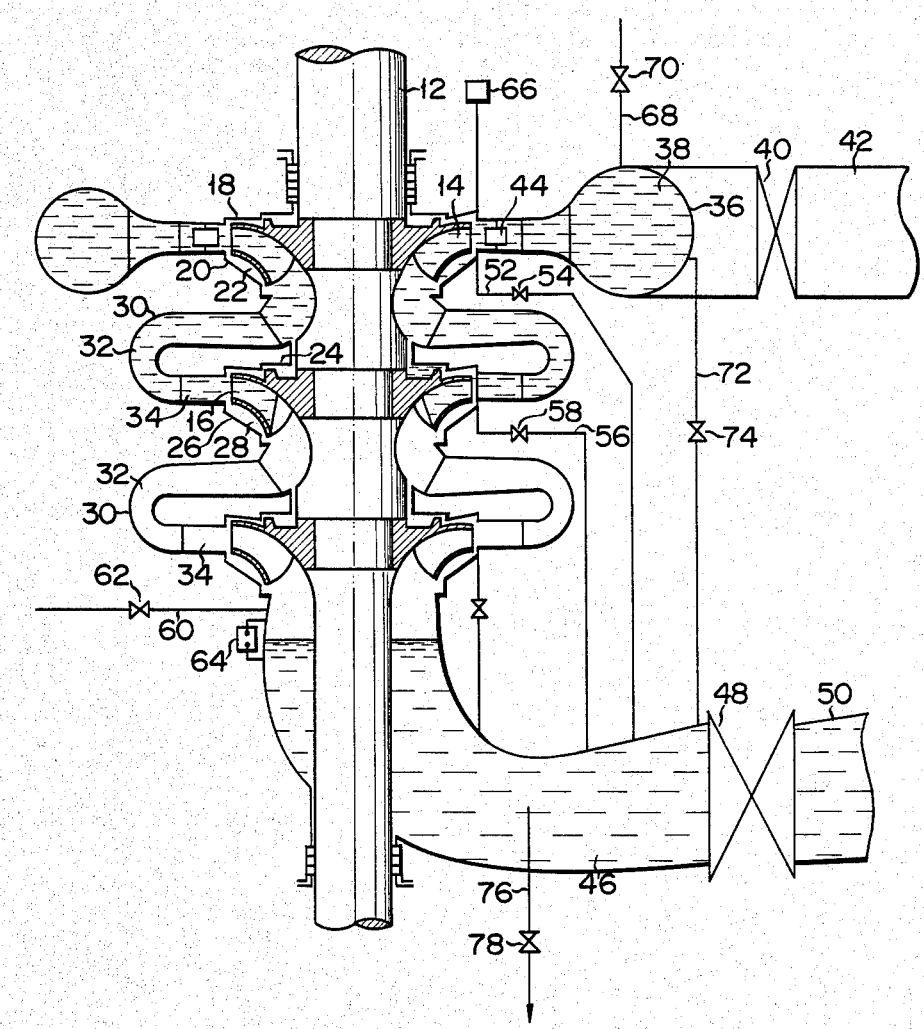
FIG. 6 is a longitudinal sectional view schematically showing a three-stage Francis type reversible pump turbine to which a control method of a third embodiment according to the present invention is applied when the water level of a draft tube is lowered.

In the above embodiment, the control method for a two-stage Francis type reversible pump turbine has been discussed. The present invention is not limited to this, but may be extended to reversible pump turbines having three or more stages. For example, the control method may be applied to a three-stage Francis type reversible pump turbine according to a third embodiment as shown in FIG. 6. Further, the present invention can also be applied to hydraulic machines such as pumps, turbines, and the like. In the above embodiments, the movable wicket gates are disposed in the highest-pressure stage runner chamber. However, the movable wicket gates may alternatively be disposed in each of the lower-pressure stage runner chamber. In this case, the movable wicket gates without ones in the highest-pressure stage runner chamber is opened.

What we claim is:

1. A control method for a multi-stage hydraulic machine which comprises a rotatable shaft; a plurality of runners fixed to said shaft and arranged from a highest-pressure stage to a lowest-pressure stage; runner chambers which, respectively, house said runners; a return channel for connecting adjacent ones of said runner chambers with each other; movable wicket gates provided at least in said highest-pressure stage and capable of moving between a position in which said movable wicket gates block the channel and a position in which said movable wicket gates open the channel; a casing connected to said highest-pressure stage, and an inlet valve disposed between said casing and a penstock, said method comprising a first step of causing said movable wicket gates and said inlet valve to block the channel;

a second step of feeding air to an upper portion of a draft tube which is connected to a lower portion of said lowest-pressure stage after the channel is substantially blocked by said movable wicket gates;

a third step of discharging water in said return channel and said lowest-pressure stage runner chamber adjacent thereto through a lowest-pressure stage drain pipe after a water level in said draft tube is lowered to a predetermined value;

a fourth step of discharging water in said highest-pressure stage runner chamber to said draft tube through a highest-pressure stage drain pipe after a pressure in said highest-pressure stage runner chamber is lowered below a predetermined pressure; and a fifth step of interrupting the operation of air-feeding in said second step after the water level in said draft tube is stabilized at a predetermined value.

2. The control method for a multi-stage hydraulic machine according to claim 1, further comprising a sixth step of discharging water from said casing.

3. The control method for a multi-stage hydraulic machine according to claim 2, wherein said sixth step includes a first process of causing an outlet valve which is disposed in a draft tube to close an outlet channel;

a second process of communicating said casing with the outer atmosphere;

a third process of discharging water which remains between an inlet valve and said movable wicket gates to said draft tube through a casing drain pipe; and a fourth process of discharging water which remains in said draft tube to a drain pit through an outer drain pipe.

4. The control method for a multi-stage hydraulic machine according to any one of the preceding claims, further comprising a seventh step of feeding the air to that part of said return channel which is located in a lower portion of the runner chamber of each stage, before said third step and after said second step.

5. A multi-stage hydraulic machine which comprises a rotatable shaft;

a plurality of runners fixed to said shaft and arranged from a highest-pressure stage to a lowest-pressure stage;

runner chambers which, respectively, house said runners;

a return channel for connecting adjacent ones of said runner chambers with each other;

movable wicket gates provided at least in said runner chamber of the highest-pressure stage and capable of moving between a position in which said movable wicket gates block the channel and a position in which said movable wicket gates open the channel;

a casing connected to the runner chamber of the highest-pressure stage;

an inlet valve disposed between said casing and a penstock;

a draft tube connected to the runner chamber of the lowest-pressure stage;

first air supply means connected to the upper portion of said draft tube, for feeding air thereto after said movable wicket gates substantially block the channel;

a first drain pipe connected between the runner chamber of highest pressure-stage and the draft tube, having a first drain valve which is opened after a pressure in the runner chamber of the highest-pressure stage is lowered below a predetermined pressure; and a second drain pipe connected between the runner chamber of the lowest-pressure stage and the draft tube, having a second drain valve which is opened after a water level in said draft tube is lowered to a predetermined value.

6. The multi-stage hydraulic machine according to claim 5, which further comprises an outlet valve disposed between said draft tube and a tailrace;

means for communicating the casing with the outer atmosphere after the outlet valve is closed;

a third drain pipe connected between the casing and the draft tube, having a third drain valve which is opened after the casing is opened to the outer atmosphere; and a fourth drain pipe connected between the draft tube and a drain pit, having a fourth drain valve which is opened after said third drain valve is opened.

7. The multi-stage hydraulic machine according to claim 6, which further comprises second air supply means connected to the return channel adjacent to the runner chamber of the highest-pressure stage, for feeding air thereto after the second drain valve is opened.

8. The multi-stage hydraulic machine of claim 5 wherein said first drain pipe is connected to a radially outermost portion of said highest pressure stage and wherein said second drain pipe is connected to a radially outermost portion of said lowest pressure stage, whereby said highest and lowest pressure stages can be completely drained.

* * * * *